Figure 1:
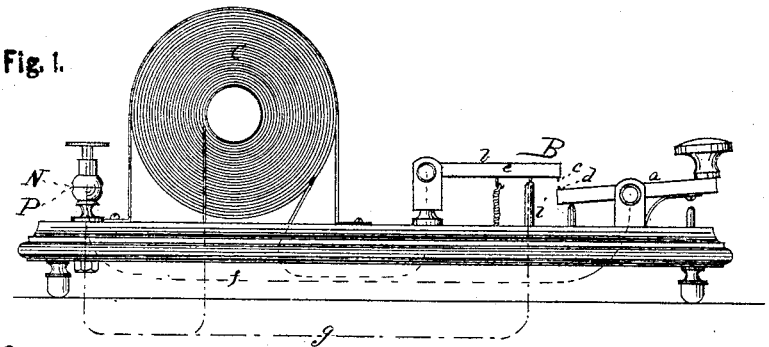

MOSES G. FARMER.

Improvement in Circuit-Closers for Electro Magnetic Apparatus.

No. 126,627.             Patented May 14, 1872.

Witnesses:
William A. Hayes Jr
Geo. B. Rand

Inventor.
Moses G. Farmer

UNITED STATES PATENT OFFICE.

MOSES G. FARMER, OF SALEM, MASSACHUSETTS.

IMPROVEMENT IN CIRCUIT-CLOSERS FOR ELECTRO-MAGNETIC APPARATUS.

Specification forming part of Letters Patent No. 126,627, dated May 14, 1872.

Specification describing a certain Improvement in Circuit-Closers for Electro-Magnetic Apparatus, invented by MOSES G. FARMER, of Salem, in the county of Essex, Commonwealth of Massachusetts.

It is a well-known phenomenon of electro-dynamic induction that when a galvanic current circulating in a coil of wire is interrupted an extra current is induced in the coil, which is rapidly discharged at the point of interruption, with the conversion of its energy into light and heat, and the consequent production of an electric spark.

I have discovered that if the extremities of the coil be connected, or, in other words, the coil be closed upon itself immediately before connection with the battery is broken, the extra current which is then induced will subside gradually instead of being discharged at once, and no spark will appear at the point at which the circuit is interrupted.

My invention consists, therefore, in an improved form of circuit-closer for effecting this result, and is illustrated in the drawing accompanying and forming a part of this specification, in which—

Figure 2:
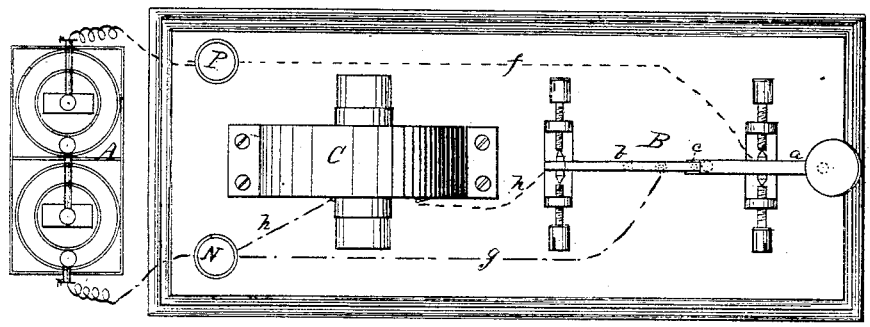

Figure 1 represents a side elevation of the coil, circuit-closing device, and their connections when the circuit is broken; Fig. 2, a plan view; and Fig. 3 a side elevation when the circuit is closed.

In the drawing, A represents a galvanic battery; B, a circuit-closing key, consisting of two levers, $a$ and $b$, so arranged in relation to each other that when the front end of the lever $a$ is depressed its other end will be brought in contact with the front end of the lever $b$; and C, an electro-magnetic coil. The connections with the battery, circuit-closer, and coil are represented by dotted lines. The positive pole P of the battery is connected by a wire, $f$, with the front end of the circuit-closer at the lever $a$, while the negative pole N is connected to the coil, and through it to the back end of the circuit-closer at $b$ by a wire, $h$. Another wire, $g$, also connects the negative pole with the contact stop $i$.

Figure 3:
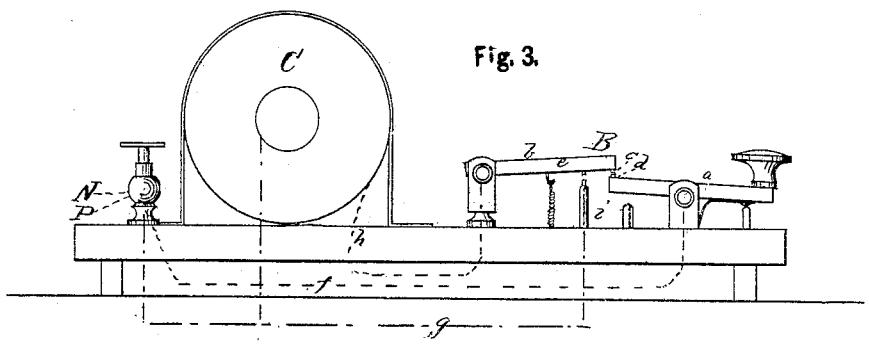

As will be seen by following the dotted lines in Fig. 3, the course of the current when the circuit is closed, by depressing the lever $a$, is as follows: From the positive pole it passes by the wire $f$ to the lever $a$, thence through the contact points $c$ and $d$ on the levers $a$ and $b$, respectively, to the lever $b$, thence by the wire $h$ to the coil C, and through it to the negative pole. When the key is released the circuit is broken by the separation of the points $c$ and $d$, as shown in Fig. 1; but before this takes place the lever $b$ comes in contact with the point $i$, which is in connection, as before stated, with the negative pole of the battery by the wire $g$. The ends of the coil are connected through $g$, $h$, $b$, $e$, and $i$, and consequently no spark appears when the points $c$ and $d$ are separated.

I have represented this arrangement, by which the ends of the coil are connected together just before the battery-circuit is broken, as applied to a lever-key for the purposes of clear explanation; but the same can be applied to other forms of circuit-closers.

What I claim as my invention, and desire to secure by Letters Patent, is—

A circuit-closing device, by which the ends of an electro-magnetic coil are connected just before the connection with the battery exciting said coil is broken, for the purpose of preventing the spark due to the extra current, substantially in the manner and for the purpose set forth.

MOSES G. FARMER.

Witnesses:
WILLIAM A. HAYES, Jr.,
GEO. B. RAND.